United States Patent
Park et al.

(10) Patent No.: US 10,443,720 B2
(45) Date of Patent: Oct. 15, 2019

(54) APPARATUS FOR MOVING SHIFT RAIL OF TRANSMISSION

(71) Applicant: Hyundai Motor Company, Seoul (KR)

(72) Inventors: In Tae Park, Hwaseong-si (KR); Jeong Heon Kam, Seongnam-si (KR); Han Ki Hong, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 239 days.

(21) Appl. No.: 15/367,073

(22) Filed: Dec. 1, 2016

(65) Prior Publication Data

US 2018/0112773 A1    Apr. 26, 2018

(30) Foreign Application Priority Data

Oct. 21, 2016  (KR) .......................... 10-2016-0137942

(51) Int. Cl.
| | | |
|---|---|---|
| *F16H 63/18* | (2006.01) | |
| *F16H 63/00* | (2006.01) | |
| *F16H 63/30* | (2006.01) | |
| *F16H 63/32* | (2006.01) | |
| *F16H 25/18* | (2006.01) | |

(52) U.S. Cl.
CPC .......... *F16H 63/18* (2013.01); *F16H 25/183* (2013.01); *F16H 2063/005* (2013.01); *F16H 2063/3079* (2013.01); *F16H 2063/322* (2013.01)

(58) Field of Classification Search
CPC .......... F16H 3/08; F16H 3/083; F16H 25/183; F16H 63/18; F16H 63/30; F16H 2063/005; F16H 2063/321; F16H 2063/322; F16H 2063/3079

USPC ...................................................... 74/337.5
See application file for complete search history.

(56) References Cited

U.S. PATENT DOCUMENTS

| | | | | | |
|---|---|---|---|---|---|
| 1,760,710 | A | * | 5/1930 | Mitchell | B66C 3/125 74/337.5 |
| 2,577,019 | A | * | 12/1951 | Kesterton | F16H 63/18 74/334 |
| 2,839,941 | A | * | 6/1958 | Rugen | B60T 1/005 192/219.4 |

(Continued)

FOREIGN PATENT DOCUMENTS

| | | |
|---|---|---|
| KR | 10-0911577 B1 | 8/2009 |
| KR | 2010-0064419 A | 6/2010 |

(Continued)

*Primary Examiner* — Jake Cook
*Assistant Examiner* — T. Scott Fix
(74) *Attorney, Agent, or Firm* — Morgan, Lewis & Bockius LLP (57) ABSTRACT

An apparatus for moving a shift rail of a transmission may include a control shaft provided to be moved in a direction perpendicular to a plurality of shift rails by an actuator, a plurality of rollers protruding from one selected among a corresponding one of the shift rails and the control shaft, the rollers being formed on one of facing sides of the shift rail and the control shaft, and a cam protruding in an S-shaped form from a remaining one selected among the corresponding shift rail and the control shaft, on which no roller is formed, the cam being provided to selectively move the shift rails in an axial direction by moving while coming into contact at opposite sides thereof with the rollers depending on a distance by which the control shaft is moved.

4 Claims, 9 Drawing Sheets

(56) References Cited

U.S. PATENT DOCUMENTS

| | | | | |
|---|---|---|---|---|
| 2,929,260 A * | 3/1960 | Hodkin | ............... | F16H 3/22 |
| | | | | 74/334 |
| 3,370,477 A * | 2/1968 | Lewis | ............... | F16H 63/18 |
| | | | | 74/337.5 |
| 3,429,194 A * | 2/1969 | Jackel | ............... | F16H 63/18 |
| | | | | 74/337.5 |
| 3,954,021 A * | 5/1976 | Mraz | ............... | F16H 63/18 |
| | | | | 74/473.1 |
| 4,019,586 A * | 4/1977 | Hauser | ............... | F16D 11/10 |
| | | | | 192/48.91 |
| 4,987,790 A * | 1/1991 | Weismann | ............ | F16D 5/00 |
| | | | | 192/45.006 |
| 5,735,176 A * | 4/1998 | Winkam | ............ | F16H 63/18 |
| | | | | 74/337.5 |
| 6,019,010 A * | 2/2000 | Trinder | ............ | F16H 63/30 |
| | | | | 192/48.91 |

FOREIGN PATENT DOCUMENTS

| | | |
|---|---|---|
| KR | 10-1095719 B1 | 12/2011 |
| KR | 10-2015-0077722 A | 7/2015 |
| KR | 10-1637514 B1 | 7/2016 |

\* cited by examiner

APPARATUS FOR MOVING SHIFT RAIL OF TRANSMISSION

CROSS-REFERENCE TO RELATED APPLICATION

The present application claims priority to Korean Patent Application No. 10-2016-0137942, filed on Oct. 21, 2016, in the Korean Intellectual Property Office, the entire contents of which is incorporated herein for all purposes by this reference.

BACKGROUND OF THE INVENTION

Field of the Invention

The present invention relates to an apparatus for moving a shift rail of a transmission, which may perform shifting and selecting operations via a single actuator.

Description of Related Art

Recently, a high-efficiency engine, a high-efficiency transmission, a lightweight vehicle chassis, and the like have actively been studied to increase the fuel efficiency of vehicles. In particular, in the transmission field, the development of an automated manual transmission, which combines the high efficiency of a manual transmission with the convenience of an automatic transmission, is being actively conducted.

In such an automated manual transmission, gear shifting is automatically achieved by a gear actuator without the involvement of a driver. That is, in order to realize the high efficiency of a manual transmission, in general, shifting and selecting operations are performed by respective actuators so as to realize gear shifting.

Here, the automated manual transmission (AMT) requires two actuators for selecting and shifting operations, whereas a dual clutch transmission (DCT) requires four actuators for preliminary engagement. However, because price and power consumption increase along with the number of actuators, it has conventionally been required to reduce the number of actuators if possible.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus for moving a shift rail of a transmission, which may perform shifting and selecting operations of the transmission using a single actuator through the use of an S-shaped cam.

In accordance with an aspect of the present invention, the above and other objects can be accomplished by the provision of an apparatus for moving a shift rail of a transmission, the apparatus including a control shaft provided to be moved in a direction perpendicular to a plurality of shift rails by an actuator, a plurality of rollers protruding from one selected among a corresponding one of the shift rails and the control shaft, the rollers being formed on one of facing sides of the shift rail and the control shaft, and a cam protruding in an S-shaped form from a remaining one selected among the corresponding shift rail and the control shaft, on which no roller is formed, the cam being provided to selectively move the shift rails in an axial direction by moving while coming into contact at opposite sides thereof with the rollers depending on a distance by which the control shaft is moved.

The rollers may be formed on a corresponding one of the shift rails to be arranged side by side in the axial direction, and the cam may be formed in an S-shaped form in the axial direction along a center axis of the control shaft and is provided to pass across a gap between the rollers formed on each shift rail.

The cam may be shorter than a distance between adjacent different shift rails.

The shift rails may be moved to one side when one side of the cam comes into contact with the rollers and may be moved to an opposite side when a remaining side of the cam comes into contact with the rollers, while the control shaft is moved.

The rollers may be arranged side by side in a radial direction on the control shaft, and the cam may be formed in an S-shaped form in the radial direction on each of the shift rails and may be provided to allow the rollers to surround and pass the cam, while the control shaft is moved.

The cam may have opposite end portions having a curved shape.

The cam may be provided to continuously come into contact at opposite sides thereof with different rollers when moving between the rollers.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an apparatus for moving a shift rail of a transmission according to an exemplary embodiment of the present invention will be described with reference to the accompanying drawings.

Figure 1:
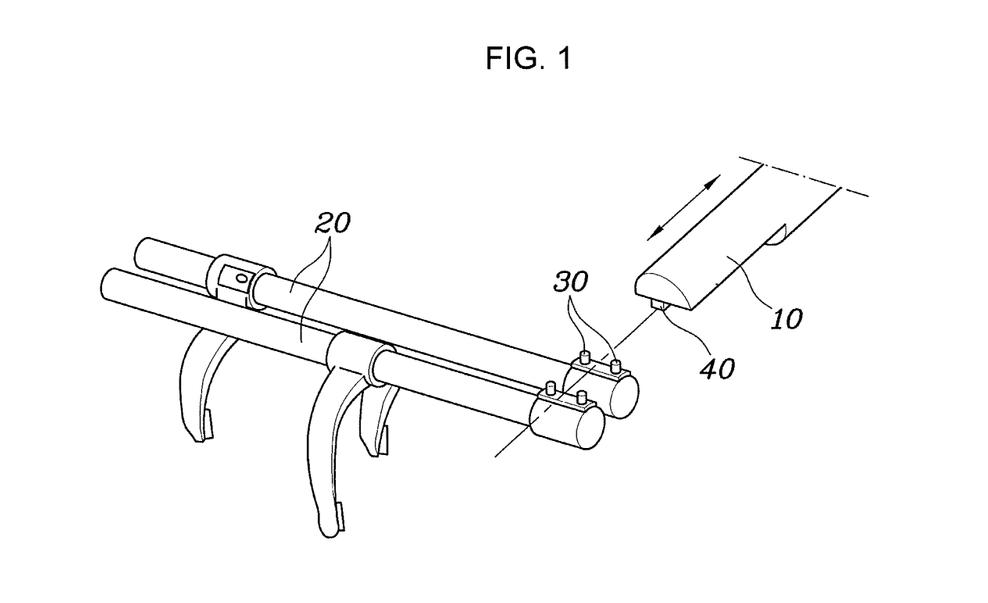
FIG. 1 is a perspective view illustrating an apparatus for moving a shift rail of a transmission according to various exemplary embodiments of the present invention.
Figure 2:
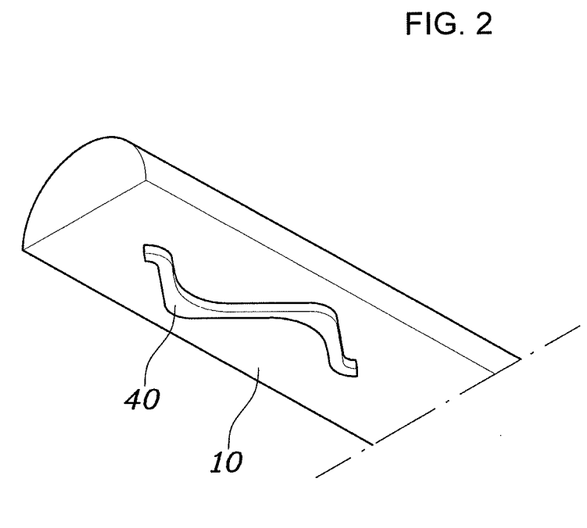
FIG. 2 is a view illustrating a cam an exemplary embodiment according to an exemplary embodiment of the present invention.

FIG. 1 is a perspective view illustrating an apparatus for moving a shift rail of a transmission according to various exemplary embodiments of the present invention, and FIG. 2 is a view illustrating a cam an exemplary embodiment according to an exemplary embodiment of the present invention. Referring to FIG. 1 and FIG. 2, the apparatus for moving a shift rail of a transmission may include a control shaft 10, which is provided to be moved in a direction perpendicular to a plurality of shift rails 20 by an actuator, a plurality of rollers 30, each of which protrudes from one selected among a corresponding shift rail 20 and the control shaft 10, the rollers 30 being formed on one of facing sides of the shift rail 20 and the control shaft 10, and a cam 40, which protrudes in an S-shaped form from the other one selected among the corresponding shift rail 20 and the control shaft 10, on which no roller 30 is formed, the cam 40 being configured to selectively move the shift rails 20 in the axial direction by moving while coming into contact, at opposite sides thereof, with the rollers 30 depending on the distance by which the control shaft 10 is moved.

Conventionally, a finger is formed on a control shaft to rotate along with the control shaft, and shift lugs are formed on plural shift rails, which correspond to the control shaft. Accordingly, gear shifting is performed via movement of the shift rails when the finger is introduced between the shift lugs to rotate.

The conventional configuration described above requires two actuators, one of which rotates the control shaft to perform a shifting operation and the other one of which moves the control shaft in the axial direction to perform a selecting operation so that the finger corresponds to one of the shift rails.

In contrast, according to the technology disclosed herein, as a result of providing the cam 40, having an S-shaped form, on one of the control shaft 10 and the shift rail 20 and providing the rollers 30 on the other one so that the cam 40 moves across the gap between the rollers 30, the shift rails 20, which are arranged side by side, may be shifted by a single actuator.

Here, because the operation of shifting the shift rails 20 is possible using only a single actuator that moves the cam 40, no selecting operation is necessary, which may reduce the number of actuators, compared to the conventional configuration.

The various exemplary embodiments of the disclosed technology has the feature by which the rollers 30 are formed on each of the shift rails 20 to be arranged side by side in the axial direction, and the cam 40 has an S-shaped form in the axial direction along the center axis of the control shaft 10 to pass across the gap between the rollers 30 formed on the shift rails 20.

As illustrated in FIG. 1 and FIG. 2, in the various exemplary embodiments, the rollers 30 are formed on the shift rails 20, and the cam 40 is formed on the control shaft 10.

The rollers 30 are formed on the shift rails 20, which are arranged side by side, in the axial direction of the shift rails 20 to protrude upward, and the cam 40 is formed on the control shaft 10, which is located at the upper side of the shift rails 20, at a position corresponding to the rollers 30 to protrude downward.

Accordingly, when the control shaft 10 is moved in the axial direction, the cam 40 is moved along with the control shaft 10 and passes through the gap between the rollers 30 formed on one of the shift rails 20 while being in contact with the rollers 30. Accordingly, the cam 40 selectively moves one of the shift rails 20 in the shifting direction.

When the control shaft 10 is moved, the shift rails 20 are moved to one side when one side of the cam 40 comes into contact with the rollers 30, and are moved to the opposite side when the other side of the cam 40 comes into contact with the rollers 30.

In addition, the cam 40 may be characterized by being shorter than the distance between the adjacent shift rails 20.

Generally, when two or more shifting gears are simultaneously coupled by a single actuator, a desired transmission gear ratio may not be realized and a breakdown may occur due to shifting shock.

In the disclosed technology, assuming that the length of the cam 40 is greater than the distance between the shaft rails 20, the shift rails 20 may be simultaneously shifted due to the shape of the cam 40, thus causing the coupling of a plurality of shifting gears. Therefore, the length of the cam 40 may be limited to ensure the coupling of only a single shifting gear via the movement of the single cam 40.

In addition, opposite end portions of the cam 40 may be curved. Accordingly, when opposite end portions of the cam 40 are introduced into the gap between the rollers 30, the phenomenon in which the end portions are caught by the rollers 30 may be prevented.

Various exemplary embodiments may have the feature by which the rollers 30 may be arranged side by side in the radial direction on the control shaft 10, and the cam 40 may be formed in an S-shaped form in the radial direction on each of the shift rails 20, so that the rollers 30 surround and pass the cams 40 when the control shaft 10 is moved.

Figure 3:
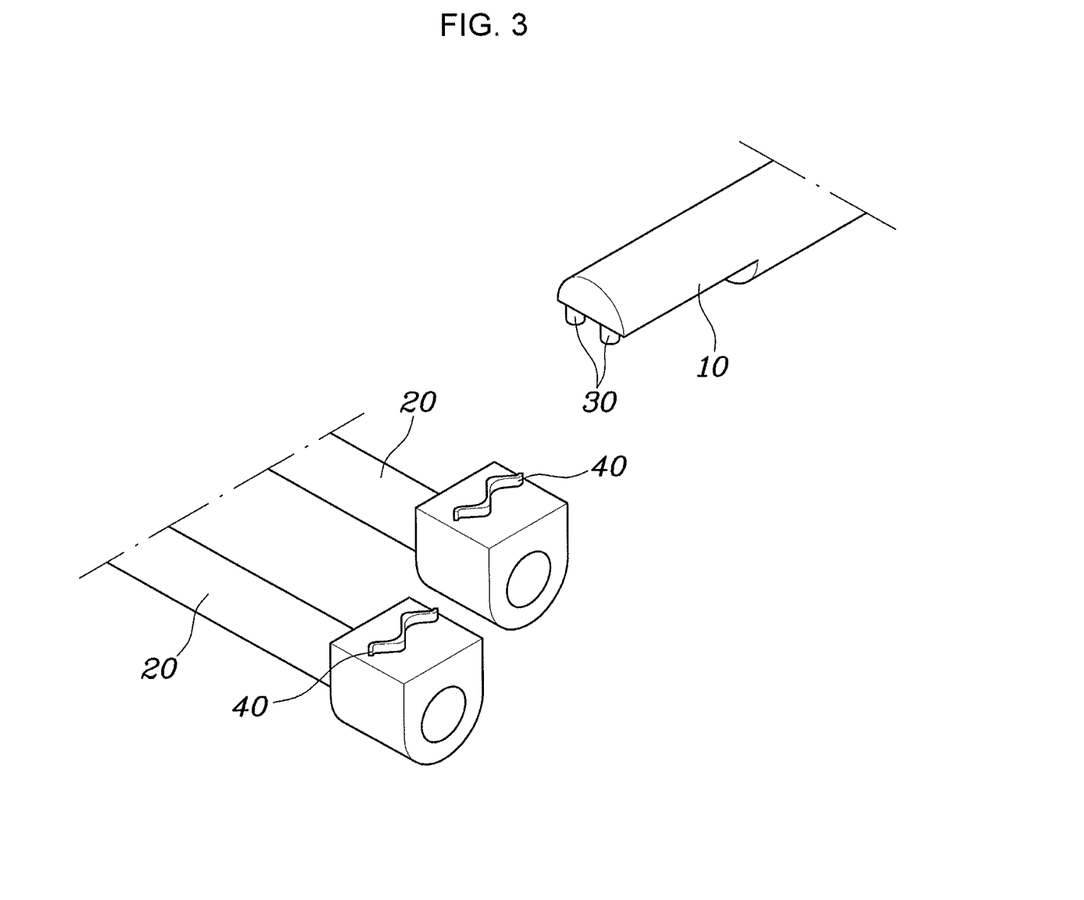
FIG. 3 is a perspective view illustrating an apparatus for moving a shift rail of a transmission according to various exemplary embodiments of the present invention.

FIG. 3 is a perspective view illustrating an apparatus for moving a shift rail of a transmission according to the various exemplary embodiments of the present invention. As illustrated in FIG. 3, in the various exemplary embodiments, unlike the various exemplary embodiments, cams 40 having an S-shaped form may be provided on the shift rails 20, and rollers 30 may be formed on the control shaft 10.

FIG. 4, FIG. 5, FIG. 6, FIG. 7, FIG. 8, and FIG. 9 are views schematically illustrating an operation of the apparatus for moving the shift rail of the transmission according to an exemplary embodiment of the present invention. Here, FIG. 4, FIG. 5, FIG. 6, FIG. 7, FIG. 8, and FIG. 9 will be described below based on the various exemplary embodiments, in which the rollers 30 are formed on the shift rails 20 and the cam 40 is formed on the control shaft 10.

For example, in a case of an AMT vehicle, one of the two shift rails 20 may be a shift rail for synchronizing a reverse gear and a first gear, and the other one may be a shift rail for synchronizing a second gear and a third gear.

Figure 4:
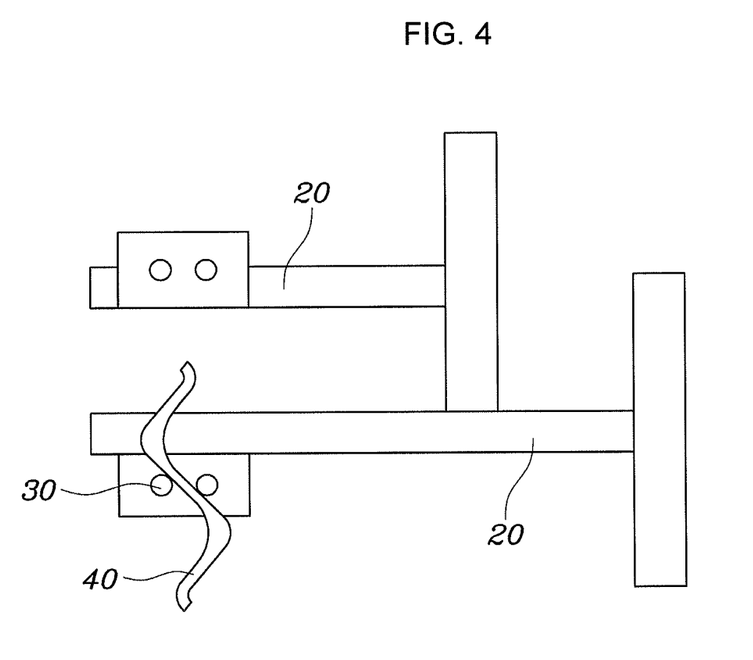
FIG. 4, FIG. 5, FIG. 6, FIG. 7, FIG. 8, and FIG. 9 are views schematically illustrating an operation of the apparatus for moving the shift rail of the transmission according to an exemplary embodiment of the present invention.

FIG. 4 illustrates the case where a shift lever is in the neutral range or the parking range, in which state the middle portion of the cam 40 may be located between the rollers 30 of the shift rail 20, which synchronizes a reverse gear and a first gear. That is, when the middle portion of the S-shaped cam 40 is located between the rollers 30, the cam 40 does not move the shift rail 20, realizing the neutral state.

Figure 5:
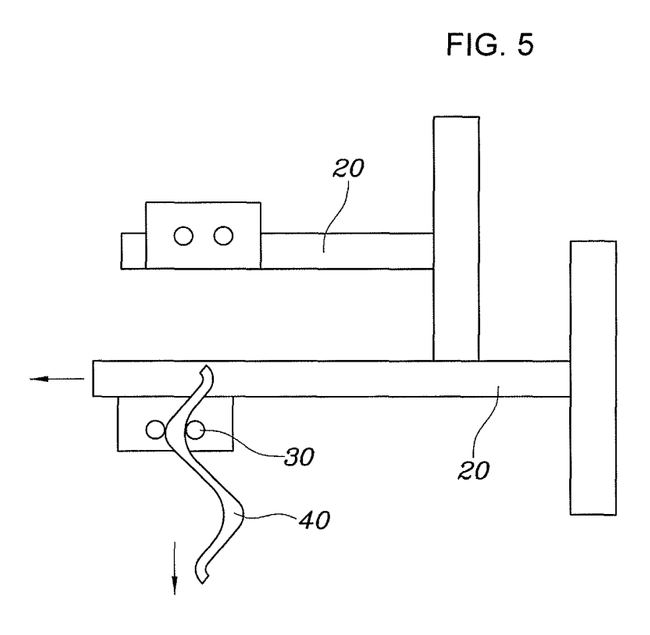

When the shift lever is manipulated to the reverse range for the backward movement of a vehicle, as illustrated in FIG. 5, the cam 40 is moved downward via the rotation of the control shaft 10, leading the coupling of a reverse gear via the movement of the shift rail 20.

Figure 6:
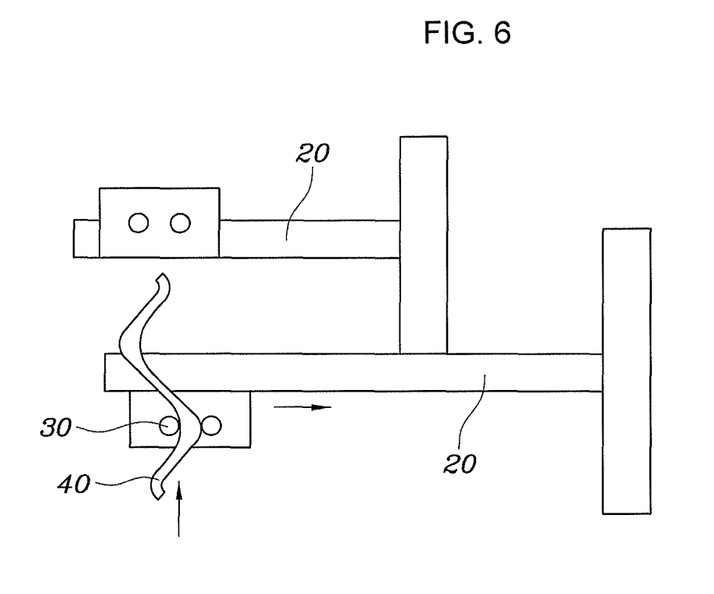

Conversely, when the shift lever is manipulated to the driving range for the forward movement of a vehicle, as illustrated in FIG. 6, the cam 40 is moved upward via the rotation of the control shaft 10. This may lead the coupling of a first gear via the movement of the shift rail 20, allowing the vehicle to perform first-gear driving.

Figure 7:
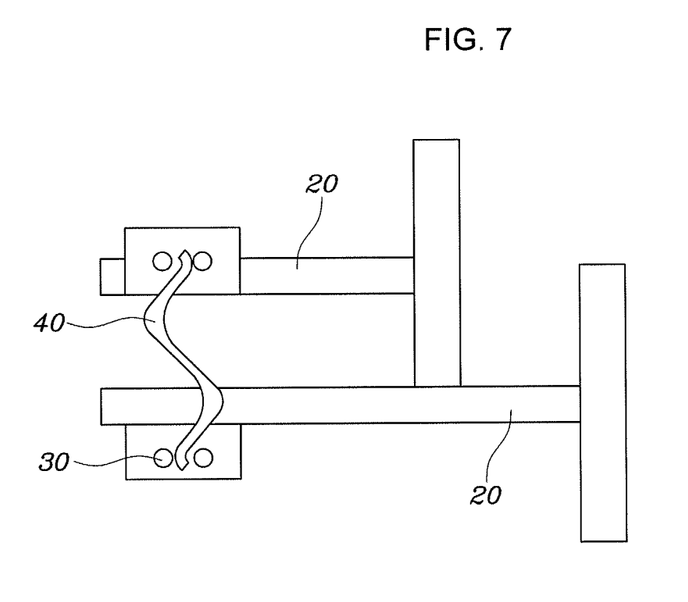
Figure 8:
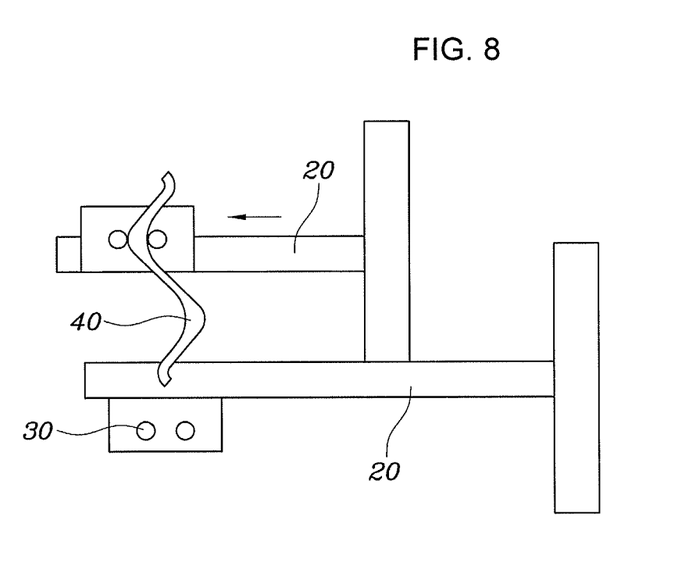

In addition, the other shift rail 20 is provided for the coupling of second and third gears. When shifting is performed from a first gear to a second gear according to a vehicle speed and an APS map, as illustrated in FIGS. 7 and 8, the cam 40 is moved upward to move the other shift rail 20, realizing the coupling of the second gear.

Figure 9:
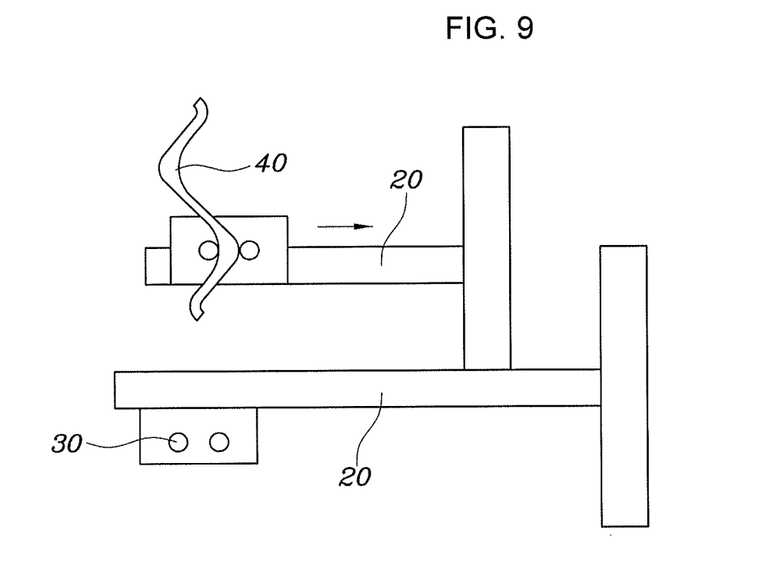

Thereafter, when shifting to a third gear is performed, as illustrated in FIG. 9, the cam 40 is moved further upward to implement the coupling of the third gear via the movement of the shift rail 20.

However, this is merely one exemplary embodiment for facilitating understanding, and the combination of shifting gears that may be coupled via the shift rails 20 may be changed depending on the vehicle, transmission or designer, and may not be limited to a specific combination.

For example, in the case of a Dual Clutch Transmission (DCT) including a plurality of transmission clutches, two actuators including an odd-gear actuator and an even-gear actuator may be provided to reduce the time taken for shifting via preliminary engagement, which is an advantage of the DCT.

That is, a control shaft operated by the odd-gear actuator is provided to interact with a shift rail that couples first and third gears, or fifth and seventh gears, and a control shaft operated by the even-gear actuator is provided to interact with a shift rail that couples a reverse gear and a second gear, or fourth and sixth gears.

Accordingly, although four actuators are required to realize a conventional DCT, according to the technology disclosed herein, a DCT may be realized using two actuators. This reduction in the number of actuators may reduce the price, weight and power consumption of the vehicle, resulting in improved vehicle marketability.

In addition, the cam 40 may be characterized in that it continuously comes into contact at opposite sides thereof with different rollers 30 when moving between the rollers 30.

To this end, because the cam 40 has an S-shaped form, the thickness of the cam 40 may vary, as illustrated in FIGS. 2 to 9. That is, an inclined portion of the S-shaped cam 40 may be thin, and a bent portion of the S-shaped cam 40 may be thick. Accordingly, when the cam 40 is moved between the rollers 30 such that opposite sides thereof are continuously in contact with the rollers 30, the control shaft 10 and the shift rail 20 may be more stably moved.

As is apparent from the above description, in an apparatus for moving a shift rail of a transmission having the configuration described above, shifting and selecting operations of the transmission are possible via a single actuator, which may reduce the number of actuators that are applied to the transmission, resulting in reduced price and reduced power consumption.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for moving a shift rail of a transmission, the apparatus including:
    a control shaft provided to be moved in a direction perpendicular to a plurality of shift rails by an actuator;
    a plurality of rollers protruding from one selected among a corresponding one of the shift rails and the control shaft, the rollers being formed on one of facing sides of the shift rail and the control shaft; and
    a cam protruding in an S-shaped form from a remaining one selected among the corresponding shift rail and the control shaft, on which no roller is formed, the cam being provided to selectively move the shift rails in an axial direction by moving while coming into contact at opposite sides thereof with the rollers depending on a distance by which the control shaft is moved,
    wherein the rollers are formed on a corresponding one of the shift rails to be arrange side by side in the axial direction,
    wherein the cam is formed in the S-shaped form in the axial direction along a center axis of the control shaft and is provided to pass across a gap between the rollers formed on each shift rail, and
    wherein the cam is shorter than a distance between adjacent different shift rails of the plurality of shift rails.

2. The apparatus according to claim 1, wherein the shift rails are moved to a first side when a first side of the cam contacts with the rollers and are moved to an opposite side when a remaining side of the cam contacts with the rollers, while the control shaft is moved.

3. The apparatus according to claim 1, wherein the cam has opposite end portions having a curved shape.

4. The apparatus according to claim 1, wherein the cam is provided to continuously contact at opposite sides thereof with different rollers of the plurality of rollers when moving between the plurality of rollers.

* * * * *